United States Patent
Cui et al.

(10) Patent No.: US 12,349,047 B2
(45) Date of Patent: Jul. 1, 2025

(54) CROSS-SUBNET CONTROLLER DISCOVERY VIA A PROXY

(71) Applicant: Ruckus IP Holdings LLC, Claremont, NC (US)

(72) Inventors: Zhineng Cui, Sunnyvale, CA (US); Yujie Zhou, Sunnyvale, CA (US); Qing Meng, Sunnyvale, CA (US); Tyan-Shu Jou, Sunnyvale, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 368 days.

(21) Appl. No.: 17/892,305

(22) Filed: Aug. 22, 2022

(65) Prior Publication Data

US 2023/0066338 A1 Mar. 2, 2023

Related U.S. Application Data

(60) Provisional application No. 63/238,321, filed on Aug. 30, 2021.

(51) Int. Cl.
*H04L 41/00* (2022.01)
*H04L 41/04* (2022.01)
(Continued)

(52) U.S. Cl.
CPC .............. *H04W 48/16* (2013.01); *H04L 41/04* (2013.01); *H04L 41/0803* (2013.01); *H04L 41/12* (2013.01); *H04L 41/24* (2013.01); *H04W 48/08* (2013.01); *H04W 64/003* (2013.01); *H04W 76/10* (2018.02); *H04W 84/12* (2013.01); *H04W 88/08* (2013.01); *H04W 88/12* (2013.01);
(Continued)

(58) Field of Classification Search
CPC ..... H04L 41/02–5096; H04L 43/02–55; H04L 69/02–40; H04W 8/005–30; H04W 24/02–10; H04W 28/02–26; H04W 48/02–20; H04W 60/005–06; H04W 64/00–006; H04W 72/02–569; H04W 74/002–0891; H04W 76/10–50; H04W 80/02–12; H04W 84/005–22; H04W 88/005–188; H04W 92/02–24
See application file for complete search history.

(56) References Cited

U.S. PATENT DOCUMENTS

2006/0179307 A1* 8/2006 Stieglitz .............. H04W 12/062
2008/0112363 A1* 5/2008 Rahman ................ H04W 8/005
2013/0103836 A1* 4/2013 Baniqued ............ H04L 41/0803

* cited by examiner

*Primary Examiner* — Timothy J Weidner
(74) *Attorney, Agent, or Firm* — Steven Stupp

(57) ABSTRACT

An access point is described. During operation, the access point may provide, addressed to a computer, a location request. In response, the access point may receive, associated with the computer, a location response that includes location information specifying an address of a controller of the access point, where the computer may be located in a same subnet in the network as the access point and/or the controller may be located in a different subnet in a network than the access point. For example, the computer may be a lightweight access point protocol (LWAPP) proxy for at least some management functions of the controller. Then, the access point may provide, addressed to the controller, a configuration request. Next, the access point may receive, associated with the controller, a configuration response that includes second information specifying a configuration of the access point.

18 Claims, 11 Drawing Sheets

(51) Int. Cl.
*H04L 41/0803* (2022.01)
*H04L 41/12* (2022.01)
*H04W 48/08* (2009.01)
*H04W 48/16* (2009.01)
*H04W 64/00* (2009.01)
*H04W 76/10* (2018.01)
*H04W 84/12* (2009.01)
*H04W 88/08* (2009.01)
*H04W 88/12* (2009.01)
*H04W 88/18* (2009.01)
*H04W 92/02* (2009.01)
*H04W 92/12* (2009.01)

(52) U.S. Cl.
CPC ............ *H04W 88/18* (2013.01); *H04W 92/02* (2013.01); *H04W 92/12* (2013.01)

CROSS-SUBNET CONTROLLER DISCOVERY VIA A PROXY

CROSS REFERENCE TO RELATED APPLICATIONS

This application claims priority under 35 U.S.C. 119(e) to U.S. Provisional Application Ser. No. 63/238,321, "Cross-Subnet Controller Discovery Via a Proxy," filed on Aug. 30, 2021, by Zhineng Cui, et al., the contents of which are herein incorporated by reference.

FIELD

The described embodiments relate to techniques for discovery a controller in a different subnet and/or offloading of management by the controller via a proxy, such as a lightweight access point protocol (LWAPP) proxy.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

In an enterprise Wi-Fi network, there is typically a controller that manages access points, e.g., by providing configuration management, user authentication, events/alarms reports, statistics reports, and/or monitors access-point functions. In order to reduce complexity in a large-scale deployment with hundreds of access points, an access point usually auto-discovers its controller in the same subnet in the network, and the access point is automatically configured by its controller. LWAPP or control and provisioning of wireless access points or CAPWAP (which based on LWAPP) are two communication protocols that are often used during communication between an access point and a controller.

In principle, a variety of redirect techniques may be used to provide the address of a controller to an access point, e.g., in a virtual local area network (VLAN). For example, the address of the controller may be provided using: dynamic host control protocol (DHCP) option 43, a domain name server (DNS), or an access point register (APR). However, these approaches usually require extra configuration of the access point or an external server (which may provide the DHCP or DNS functionality), which may complicate the configuration process.

Moreover, while there may be many access points in a large subnet, these access points may belong to different organizations and may have a different controller in one or more other subnets. In these circumstances, it may be difficult to use the existing redirect techniques to automatically redirect an access point to its controller. Furthermore, in a large-scale deployment, maintaining a large number of LWAPP connections between access points and a controller may be a large burden for the controller, which may increase cost and complexity. Consequently, the existing redirect techniques may frustrating for communication-network equipment providers, network operators, and for customers.

SUMMARY

In a first group of embodiments, an access point is described. This access point may include an interface circuit that communicates with a computer and a controller of the access point using a wired communication protocol. During operation, the access point may provide, addressed to the computer, a location request. In response, the access point may receive, associated with the computer, a location response that includes location information specifying an address of the controller, where the controller is located in a different subnet in a network than the access point. Then, the access point may provide, addressed to the controller, a configuration request. Next, the access point may receive, associated with the controller, a configuration response that includes second information specifying a configuration of the access point.

Moreover, the access point may provide, addressed to the controller, a heartbeat message.

Furthermore, the computer may be a lightweight access point protocol (LWAPP) proxy for at least some management functions of the controller.

Additionally, the computer may be located in a same subnet in the network as the access point.

Another embodiment provides the computer, which performs counterpart operations to those performed by the access point or the controller. Note that the computer may be preconfigured with the location information.

Another embodiment provides the controller, which performs counterpart operations to those performed by the computer.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by the one of the aforementioned components. This method includes at least some of the aforementioned operations in one or more of the preceding embodiments.

In a second group of embodiments, an access point is described. This access point may include an interface circuit that communicates with a computer using a wired communication protocol. During operation, the access point may provide, addressed to the computer, a configuration request. Next, the access point may receive, associated with the computer, a configuration response that includes information specifying a configuration of the access point, where the information associated with the computer is on behalf of a controller of the access point.

Note that the computer may be located in a same subnet in a network as the access point.

Moreover, the controller may be located in a different subnet in the network than the access point.

Furthermore, the access point may provide, addressed to the computer, a heartbeat message, an event message or station information. In response, the computer may provide, addressed to the controller, the heartbeat message, the event message or the station information.

Additionally, the computer may be an LWAPP proxy for management functions of the controller.

In some embodiments, the computer may maintain an LWAPP connection with the controller.

Moreover, the access point may provide, addressed to the computer, a location request. In response, the access point may receive, associated with the computer, a location response that includes location information specifying an address of the controller. Then, the access point may communicate, with the controller, connection management information. For example, the connection management information may include authentication information.

Another embodiment provides the computer, which performs counterpart operations to those performed by the access point or the controller. Note that the computer may be preconfigured with the location information.

Another embodiment provides the controller, which performs counterpart operations to those performed by the computer.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by the one of the aforementioned components. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
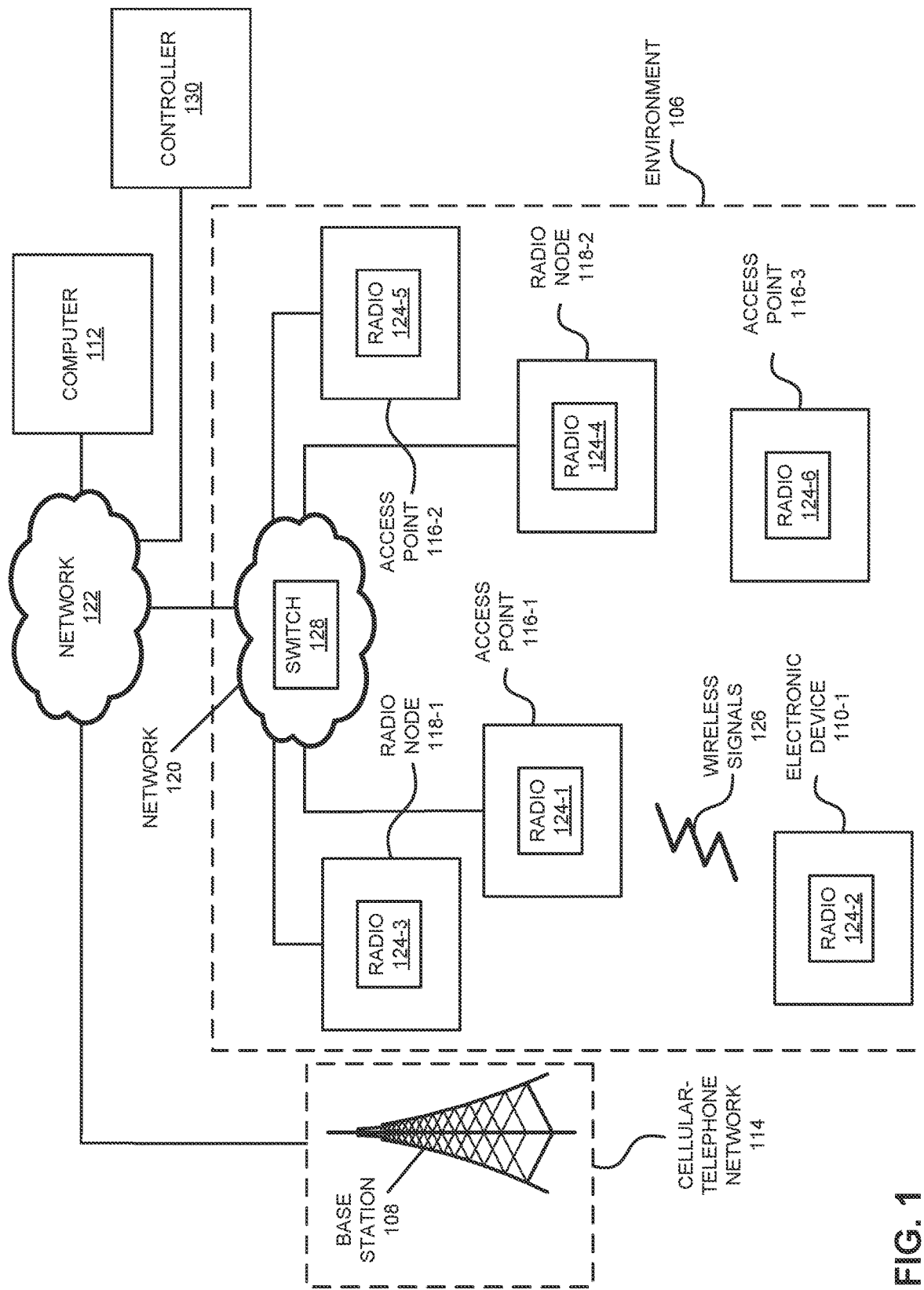
FIG. 1 is a block diagram illustrating an example of communication among electronic devices in accordance with an embodiment of the present disclosure.

An access point is described. During operation, the access point may provide, addressed to a computer, a location request. In response, the access point may receive, associated with the computer, a location response that includes location information specifying an address of a controller of the access point, where the computer may be located in a same subnet in the network as the access point and/or the controller may be located in a different subnet in a network than the access point. For example, the computer may be a LWAPP proxy for at least some management functions of the controller. Then, the access point may provide, addressed to the controller, a configuration request. Next, the access point may receive, associated with the controller, a configuration response that includes second information specifying a configuration of the access point. In some embodiments, the access point may provide, addressed to the controller, a heartbeat message.

Moreover, during operation, the computer may receive, associated with the controller, second configuration information that specifies the access point and that may specify the location information. Then, the computer may receive, associated with the access point, the location request. Next, the computer may provide, addressed to the access point and based at least in part on the location request, the location response that includes the location information specifying the address of the controller. In some embodiments, the computer may maintain a LWAPP connection with the controller. Note that the computer may be the LWAPP proxy for a subset of access points in a subnet of the access point, where the subset of the access points includes the access point.

Furthermore, during operation, the controller may provide, addressed to the computer, the second configuration information that specifies the access point and that may specify the location information. Then, the controller may receive, associated with the access point, the configuration request. Next, the controller may provide, addressed to the access point, the configuration response that includes the second information specifying the configuration of the access point. Note that the controller may also be a controller of a second access point in a different subnet in the network than the access point, and a second computer may be an LWAPP proxy of at least some of the management functions of the controller for the second access point.

By redirecting the access point to the controller via the computer, these communication techniques may enable discovery of the controller and/or configuration of the access point. More generally, the communication techniques may allow the controller to offload at least some of its management functions to the computer. In the process, the communication techniques may reduce the cost and the complexity of monitoring and managing large-scale deployments, which include access point in different subnets of a network and/or that are associated with different organizations. Consequently, the communication techniques may increase the satisfaction of users of the controller, the computer and/or the access points, such as network operators and/or customers.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet 11 standard. However, a wide variety of communication protocols may be used in the system, including wired and/or wireless communication. In the discussion that follows, Wi-Fi, LTE and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, computer 112 and/or controller 130 (which may be a local or a cloud-based controller that manages and/or configures access points 116, radio nodes 118 and/or switch 128, or that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 11:
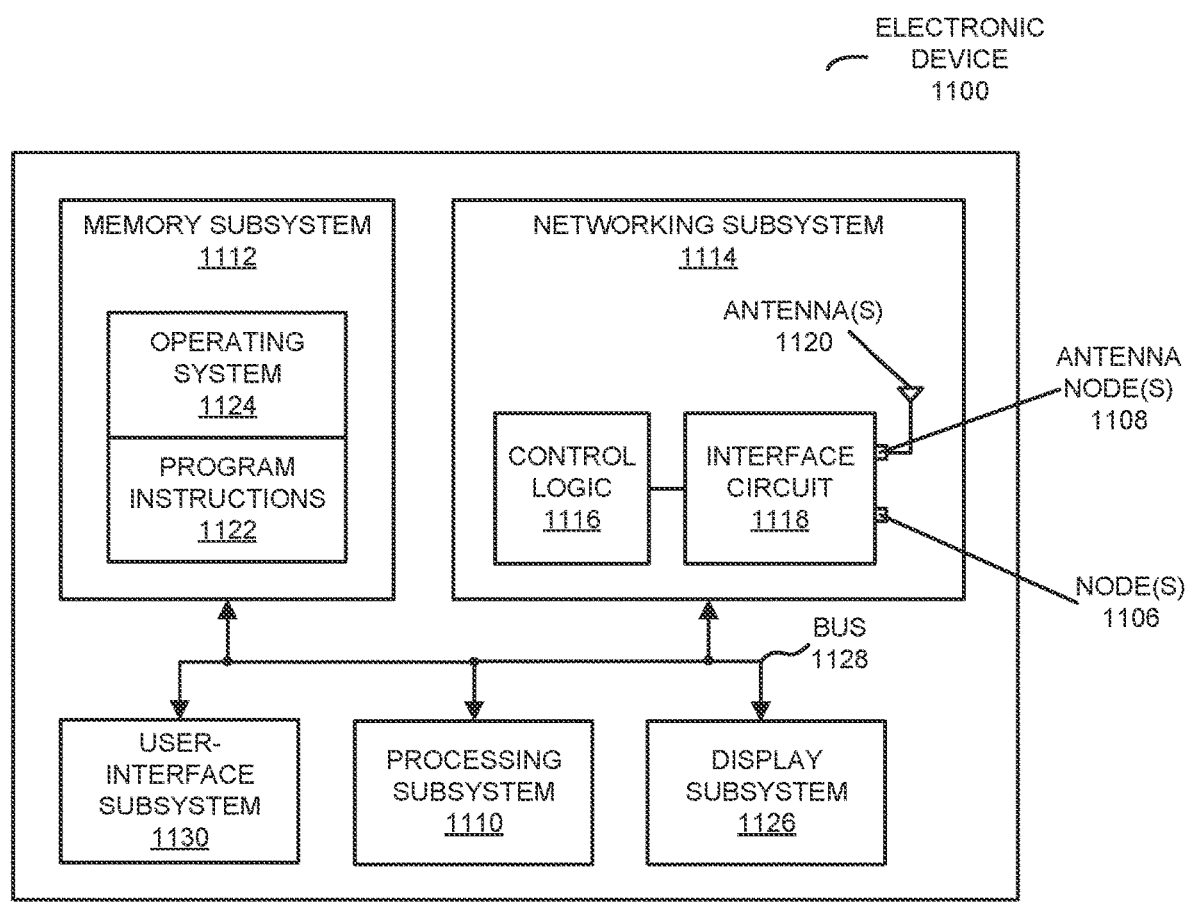
FIG. 11 is a block diagram illustrating an example of an electronic device in accordance with an embodiment of the present disclosure.

As described further below with reference to FIG. 11, electronic devices 110, computer 112, access points 116, radio nodes 118, switch 128 and controller 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be complicated and expensive to automatically redirect a computer-network device (such as access point 116-1) to its controller (such as controller 130), such as in a large-scale deployment. As described further below with reference to FIGS. 2-10, in order to addresses these difficulties, computer 112 may function as a proxy for controller 130. For example, computer 112 may redirect access point 116-1 to controller 130 or facilitate automatic discovery of controller 130 by access point 116-1. Subsequently, controller 130 may configure access point 116-1 and, more generally, may perform monitoring and management functions. However, in other embodiments, in addition to facilitating discovery of controller 130 by access point 116-1, controller 130 may offload at least some monitoring and/or management functions to computer 112. In these embodiments, computer 112 may redirect access point 116-1 to controller 130 or facilitate automatic discovery of controller 130 by access point 116-1. Subsequently, computer 112 may configure access point 116-1 and, more generally, may perform at least some monitoring and management functions. Thus, the disclosed communication techniques may include hybrid and/or full proxy modes.

In these ways, the communication techniques may allow computer 112 to facilitate automatic discovery of controller 130 by computer-network devices and/or may allow controller to offload at least some monitoring and management functions to computer 112. This may reduce the cost and the complexity of supporting multiple computer-network devices, such as in large deployments with multiple subnets and/or computer-network devices associated with different organizations.

Figure 2:
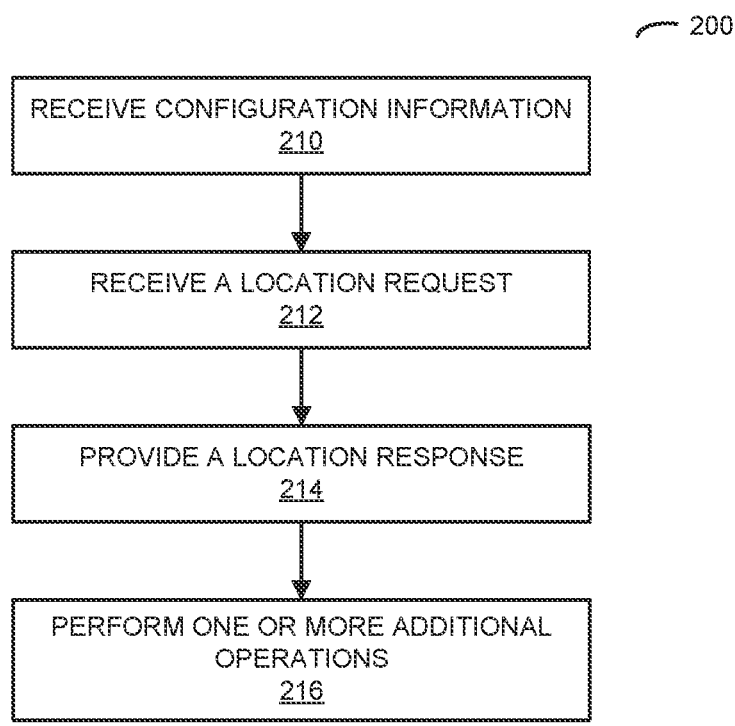
FIG. 2 is a flow diagram illustrating an example of a method for configuring an access point using a computer in FIG. 1 in accordance with an embodiment of the present disclosure.

We now describe embodiments of the method that use a hybrid proxy. FIG. 2 presents a flow diagram illustrating an example of a method 200 for configuring an access point, which may be performed by a computer (such as computer 112, which may be a proxy of a controller of at least an access point). During operation, the computer may receive, associated with or from the controller, configuration information (operation 210) that specifies the access point. Then, the computer may receive, associated with or from the access point, a location request (operation 212). Next, based at least in part on the location request, the computer may provide, addressed to the access point, a location response (operation 214) that includes location information specifying an address of the controller, where the controller is located in a different subnet in a network than the access point.

In some embodiments, the computer performs one or more additional operations (operation 216). For example, the computer may maintain a LWAPP connection with the controller. The computer may communicate with the controller via the LWAPP connection.

Moreover, the computer may be a LWAPP proxy for at least some management functions of the controller. For example, the computer may be the LWAPP proxy for a subset of access points in a subnet of the access point, and the subset of the access points may include the access point. Furthermore, the computer may be located in a same subnet in the network as the access point.

Additionally, the configuration information may include the location information.

Note that a subnet may by a logical subdivision of an Internet protocol (IP) network. Moreover, the practice of dividing a network into two or more networks is sometimes referred to as 'subnetting.' Note that computer-network devices that belong to the same subnet may be addressed with an identical most-significant bit-group in their IP addresses.

Figure 3:
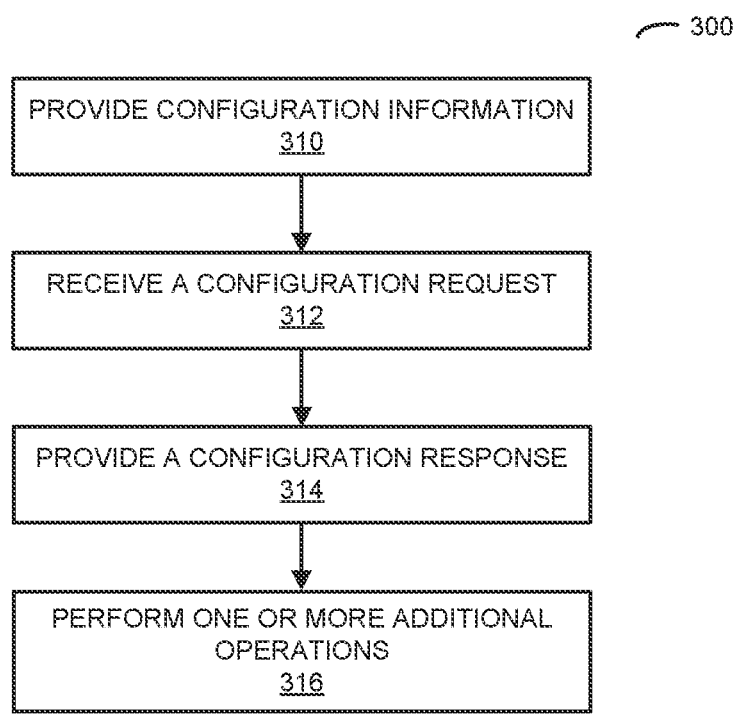
FIG. 3 is a flow diagram illustrating an example of a method for providing an address to an access point using a computer in FIG. 1 in accordance with an embodiment of the present disclosure.

FIG. 3 presents a flow diagram illustrating an example of a method 300 for providing an address to an access point, which may be performed by a controller (such as controller 130, which may be a controller of at least an access point and, more generally, one or more computer-network devices). During operation, the controller may provide, addressed to a computer (such as a proxy for the controller), configuration information (operation 310) that specifies the access point. For example, the configuration information may include location information, which includes an address of the controller.

Then, the controller may receive, associated with or from the access point, a configuration request (operation 312), where the controller is located in a different subnet in a network than the access point. Next, the controller may provide, addressed to the access point, a configuration response (operation 314) that includes second information specifying a configuration of the access point.

In some embodiments, the controller performs one or more additional operations (operation 316). For example, the controller may be configured to maintain a LWAPP connection with the computer. Moreover, the controller may communicate with the computer via the LWAPP connection.

Furthermore, the computer may include a LWAPP proxy for at least some management functions of the controller. For example, the computer may be the LWAPP proxy for a subset of access points in the subnet, which includes the access point. Additionally, the computer may be located in a same subnet in the network as the access point.

Moreover, the controller may: provide, addressed to a second computer, configuration information that specifies a second access point; receive, associated with or from the second access point, a second configuration request, where the controller is located in a different subnet in a network than the second access point and the second subnet is located in a different subnet in the network than the access point; and provide, addressed to the second access point, a second configuration response that includes third information specifying a configuration of the second access point.

Furthermore, the controller may receive, associated with or from the access point, a heartbeat message. Additionally, the controller may be a server for the access point, which may be a client.

Figure 4:
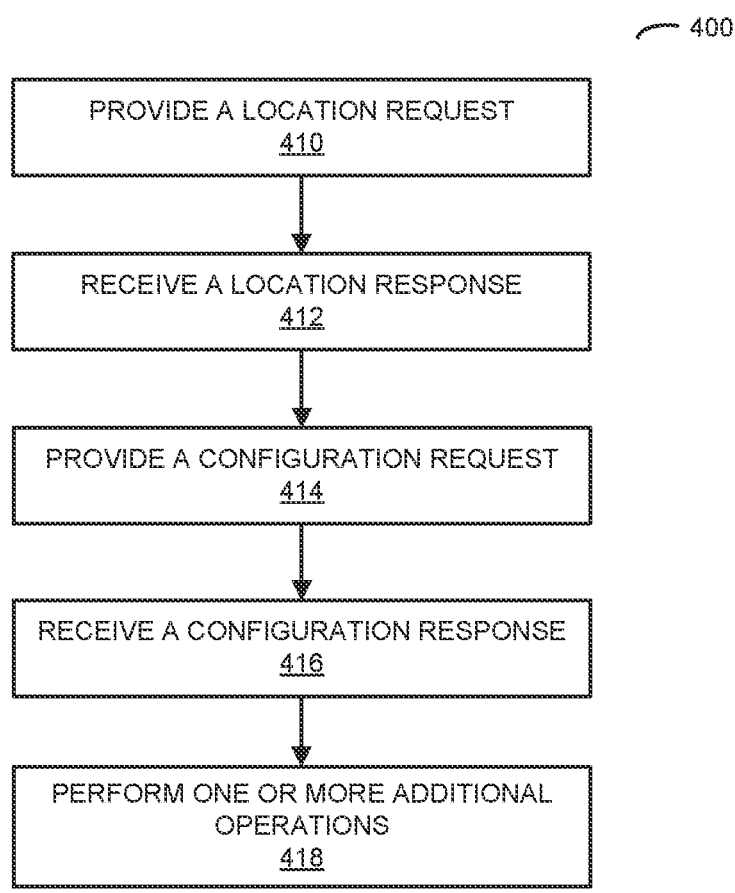
FIG. 4 is a flow diagram illustrating an example of a method for configuring an access point using a controller in FIG. 1 in accordance with an embodiment of the present disclosure.

FIG. 4 presents a flow diagram illustrating an example of a method 400 for configuring an access point (such as access point 116-1). During operation, the access point may provide, addressed to the computer, a location request (operation 410). In response, the access point may receive, associated with or from a computer (which may be a proxy of a controller of the access point), a location response (operation 412) that includes location information specifying an address of the controller, where the controller is located in a different subnet in a network than the access point. Then, the access point may provide, addressed to the controller, a configuration request (operation 414). Next, the access point may receive, associated with or from the controller, a configuration response (operation 416) that includes second information specifying a configuration of the access point.

In some embodiments, the access point performs one or more additional operations (operation 418). For example, the access point may provide, addressed to the controller, a heartbeat message.

Moreover, the computer may be a LWAPP proxy for at least some management functions of the controller. Furthermore, the computer may be located in a same subnet in the network as the access point.

Figure 5:
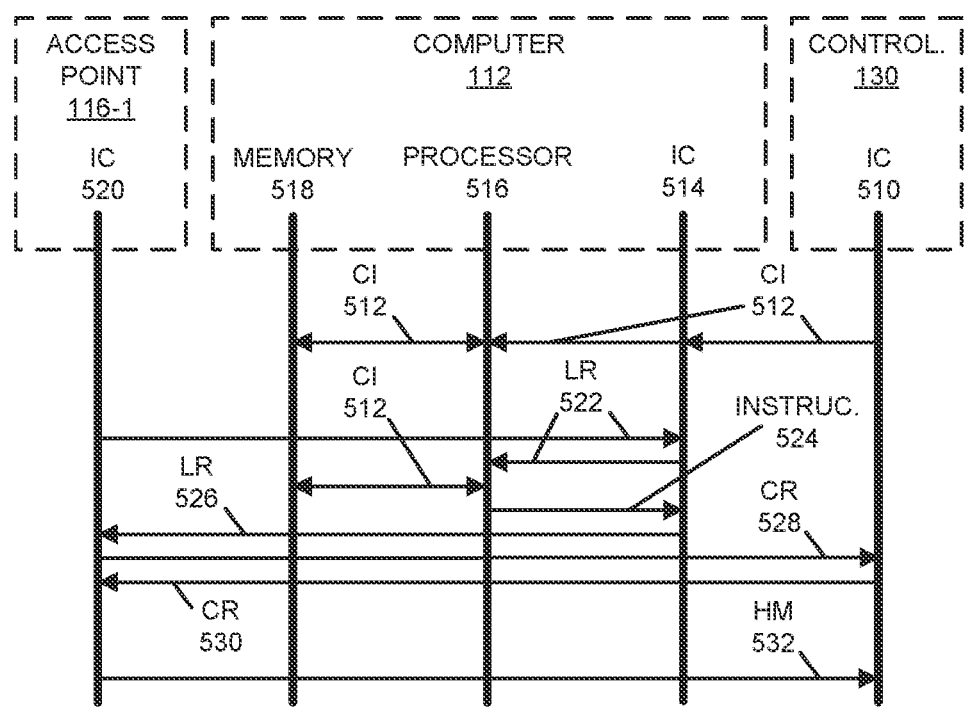
FIG. 5 is a drawing illustrating an example of communication among an access point, a computer and a controller in FIG. 1 in accordance with an embodiment of the present disclosure.

Embodiments of the communication techniques are further illustrated in FIG. 5, which presents a drawing illustrating an example of communication among access point 116-1, computer 112 and controller 130. An interface circuit (IC) 510 in controller 130 may provide, addressed to computer 112, configuration information (CI) 512 that specifies access point 116-1 and that may specify location information (such as an address of controller 130). Note that computer 112 may be a LWAPP proxy for at least some management functions of controller 130.

Then, an interface circuit (IC) 514 in computer 112 may receive, from controller 130, the configuration information 512 that specifies the access point and that may specify the location information. Interface circuit 514 may provide the configuration information 512 to a processor 516 in computer 112, which may store the configuration information 512 in memory 518 in computer 112. Note that computer 112 may be located in a same subnet in the network as access point 116-1 and/or controller 130 may be located in a different subnet in a network than access point 116-1.

Subsequently, an interface circuit (IC) 520 in access point 116-1 may provide, addressed to computer 112, a location request (LR) 522. Note that access point 116-1 may be preconfigured with the address of computer 112.

Next, interface circuit 514 may receive, from access point 116-1, location request 522, which may be provided to processor 516. In response, processor 516 may access the configuration information 512 in memory 518 and may provide an instruction 524 to interface circuit 514 to provide, addressed to access point 116-1, a location response (LR) 526 that includes the location information specifying the address of controller 130.

Moreover, after receiving location response 526, interface circuit 520 may provide, addressed to controller 130, a configuration request (CR) 528. Then, interface circuit 510 may receive, from access point 116-1, configuration request 528. Next, interface circuit 510 may provide, addressed to access point 116-1, a configuration response 530 that includes information specifying a configuration of access point 116-1.

Furthermore, interface circuit 520 may receive, from controller 130, configuration response 530. In response, access point 116-1 may perform one or more additional operations, such as updating a configuration of access point 116-1 based at least in part on the information included in configuration response 530. Additionally, interface circuit 520 may provide, addressed to controller 130, a heartbeat message (HM) 532, which may be received by interface circuit 510.

Figure 6:
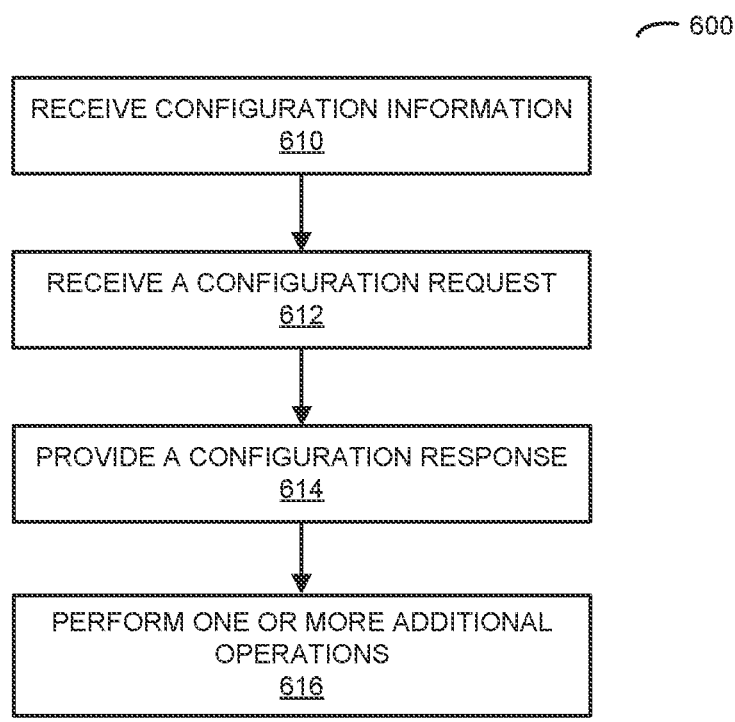
FIG. 6 is a flow diagram illustrating an example of a method for configuring an access point using a computer in FIG. 1 in accordance with an embodiment of the present disclosure.

We now describe embodiments of the method that use a full proxy. FIG. 6 presents a flow diagram illustrating an example of a method 700 for configuring an access point, which may be performed by a computer (such as computer 112, which may be a controller of at least an access point). During operation, the computer may receive, associated with or from the controller, configuration information (operation 610) that specifies the access point and that offloads at least some functions of the controller to the computer. Then, the computer may receive, associated with or from the access point, a configuration request (operation 612). Next, the computer may provide, addressed to the access point, a configuration response (operation 614) that includes information specifying a configuration of the access point, where the information associated with the computer is on behalf of the controller of the access point.

In some embodiments, the computer performs one or more additional operations (operation 616). For example, the computer may receive, associated with the access point, a heartbeat message, an event message or station information. In response, the computer may provide, addressed to the controller, the heartbeat message, the event message or the station information.

Note that the computer may be located in a same subnet in a network as the access point. Moreover, the controller may be located in a different subnet in the network than the access point.

Furthermore, the computer may be an LWAPP proxy for management functions of the controller. Additionally, the computer may maintain an LWAPP connection with the access point and/or the controller.

In some embodiments, the computer may receive, associated with the access point, a location request. In response, the computer may provide, addressed to the access point, a location response that includes location information specifying an address of the controller.

Figure 7:
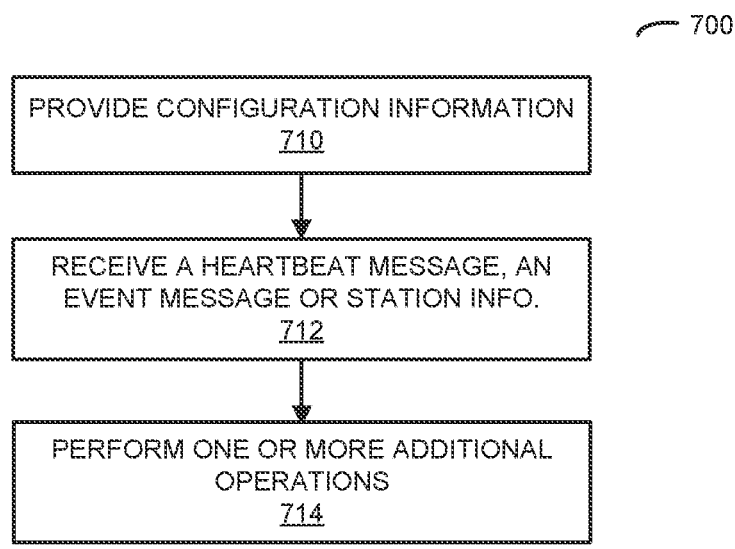
FIG. 7 is a flow diagram illustrating an example of a method for configuring an access point using a computer in FIG. 1 in accordance with an embodiment of the present disclosure.

FIG. 7 presents a flow diagram illustrating an example of a method 700 for providing an address to an access point, which may be performed by a controller (such as controller 130, which may be a controller of at least an access point and, more generally, one or more computer-network devices). During operation, the controller may provide, addressed to a computer (which may be a proxy of or for the controller), configuration information (operation 710) that specifies the access point and that offloads at least some functions of the controller to the computer. Then, the controller may receive, associated with the computer, a heartbeat message, an event message or station information (operation 712).

In some embodiments, the controller performs one or more additional operations (operation 714). For example, the controller may receive, associated with the access point, connection management information. The connection management information may include authentication information.

Note that the computer may be located in a same subnet in a network as the access point. Moreover, the controller may be located in a different subnet in the network than the access point.

Furthermore, the computer may be an LWAPP proxy for management functions of the controller. Additionally, the controller may maintain an LWAPP connection with the computer.

Figure 8:
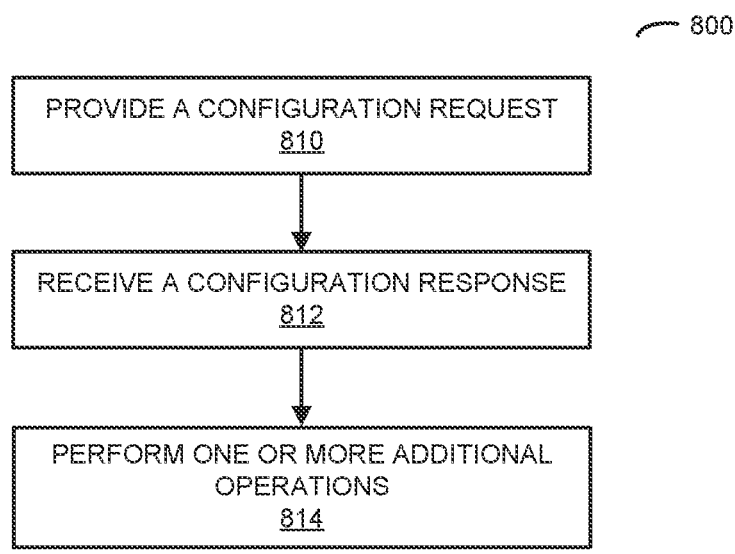
FIG. 8 is a flow diagram illustrating an example of a method for configuring an access point using a controller in FIG. 1 in accordance with an embodiment of the present disclosure.

FIG. 8 presents a flow diagram illustrating an example of a method 800 for configuring an access point (such as access point 116-1). During operation, the access point may provide, addressed to a computer (which may be a proxy of a controller of the access point), a configuration request (operation 810). Next, the access point may receive, associated with or from the computer, a configuration response (operation 812) that includes information specifying a configuration of the access point, where the information associated with the computer is on behalf of a controller of the access point.

In some embodiments, the access point performs one or more additional operations (operation 814). For example, the access point may provide, addressed to the computer, a heartbeat message, an event message or station information. In response, the computer may provide, addressed to the controller, the heartbeat message, the event message or the station information.

Note that the computer may be located in a same subnet in a network as the access point. Moreover, the controller may be located in a different subnet in the network than the access point.

Furthermore, the computer may be an LWAPP proxy for management functions of the controller. Additionally, the access point may maintain an LWAPP connection with the computer.

In some embodiments, the access point may provide, addressed to the computer, a location request. In response, the access point may receive, associated with the computer, a location response that includes location information specifying an address of the controller. Then, the access point may communicate, with the controller, connection management information. For example, the connection management information may include authentication information.

In some embodiments of method 200 (FIG. 2), 300 (FIG. 3), 400 (FIG. 4), 600 (FIG. 6), 700 (FIG. 7), and/or 800, there may be additional or fewer operations. Furthermore, the order of the operations may be changed, and/or two or more operations may be combined into a single operation. For example, in some embodiments, the communication with the computer and/or the controller may occur, at least in part, using a wireless communication protocol.

Figure 9:
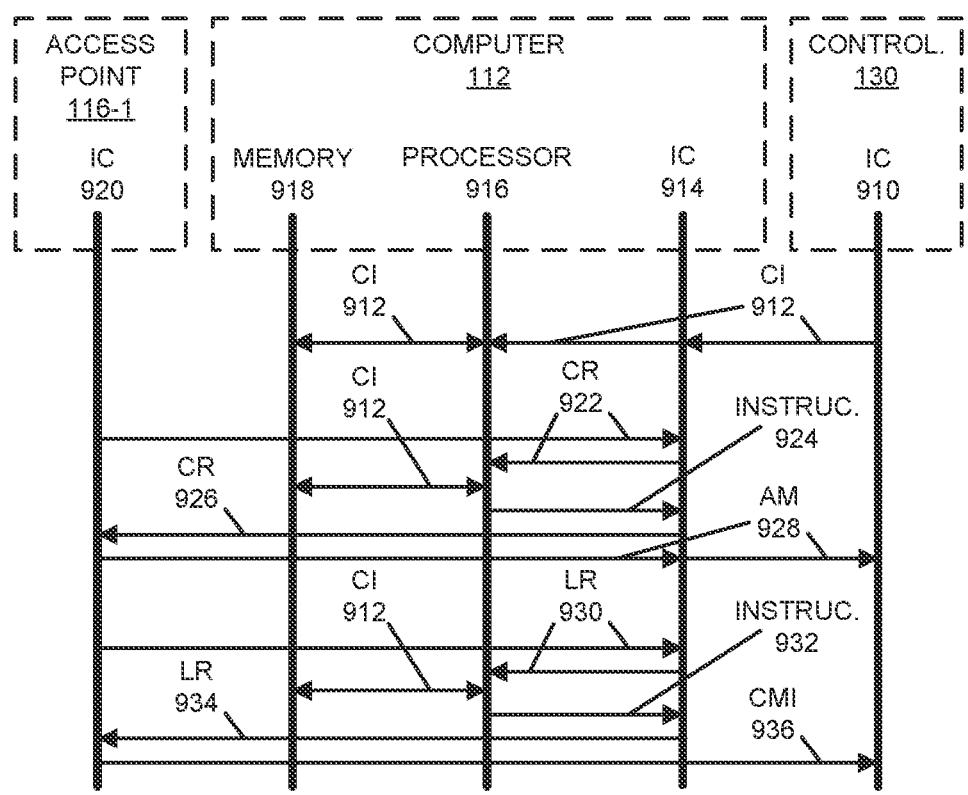
FIG. 9 is a drawing illustrating an example of communication among an access point, a computer and a controller in FIG. 1 in accordance with an embodiment of the present disclosure.

Embodiments of the communication techniques are further illustrated in FIG. 9, which presents a drawing illustrating an example of communication among access point 116-1, computer 112 and controller 130. An interface circuit (IC) 910 in controller 130 may provide, addressed to computer 112, configuration information (CI) 912 that specifies access point 116-1 and that offloads at least some functions of controller 130 to computer 112. In some embodiments, the configuration information 912 may include or specify location information (such as an address of controller 130). Note that computer 112 may be a LWAPP proxy for at least some management functions of controller 130.

Then, an interface circuit (IC) 914 in computer 112 may receive, from controller 130, the configuration information 912 that specifies the access point and that offloads at least some functions of controller 130 to computer 112. Interface circuit 514 may provide the configuration information 912 to a processor 916 in computer 112, which may store configuration information 912 in memory 918 in computer 112. Note that computer 112 may be located in a same subnet in the network as access point 116-1 and/or controller 130 may be located in a different subnet in a network than access point 116-1.

Subsequently, an interface circuit (IC) 920 in access point 116-1 may provide, addressed to computer 112, a configuration request (CR) 922. Note that access point 116-1 may be preconfigured with the address of computer 112.

Next, interface circuit 914 may receive, from access point 116-1, configuration request 922, which may be provided to processor 916. In response, processor 916 may access the configuration information 912 in memory 918 and may provide an instruction 924 to interface circuit 914 to provide, addressed to access point 116-1, a configuration response (CR) 926 that includes information specifying a configuration of access point 116-1.

Moreover, after receiving configuration response 926, interface circuit 920 may perform one or more additional operations, such as updating a configuration of access point 116-1 based at least in part on the information included in configuration response 926. Additionally, interface circuit 920 may provide, addressed to computer 112, another message (AM) 928, such as a heartbeat message, an event message or station information. This other message may be received by interface circuit 914, which provides, addressed to controller 130, the other message 928. Interface circuit 910 may receive, associated with computer 112, the other message 928.

Furthermore, interface circuit 920 may provide, addressed to computer 112, a location request (LR) 930. Next, interface circuit 914 may receive, from access point 116-1, location request 930, which may be provided to processor 916. In response, processor 916 may access the configuration information 912 in memory 918 and may provide an instruction 932 to interface circuit 914 to provide, addressed to access point 116-1, a location response (LR) 934 that includes the location information specifying the address of controller 130.

Moreover, after receiving location response 934, interface circuit 920 may provide, addressed to controller 130, a connection management information (CMI) 936. Then, interface circuit 910 may receive, from access point 116-1, connection management information 936. Subsequently, controller 130 may perform one or more additional operations, such as authenticating a user of access point 116-1.

While FIGS. 5 and 9 illustrate communication between components using unidirectional or bidirectional communication with lines having single arrows or double arrows, in general the communication in a given operation in this figure may involve unidirectional or bidirectional communication. Moreover, while FIGS. 5 and 10 illustrate operations being performed sequentially or at different times, in other embodiments at least some of these operations may, at least in part, be performed concurrently or in parallel.

In the disclosed communication techniques, an LWAPP proxy is proposed to automatically redirect an access point to its controller, which may be in a different subnet. Moreover, the controller may offload some of its management functions to the LWAPP proxy, which may be helpful in a large-scale deployment. In some embodiments, there may be more than one proxy in the same subnet to redirect different access points to different controllers. With multiple proxies, the access points in the same subnet may be automatically divided into two or more different groups and may provide services to different customers.

Figure 10:
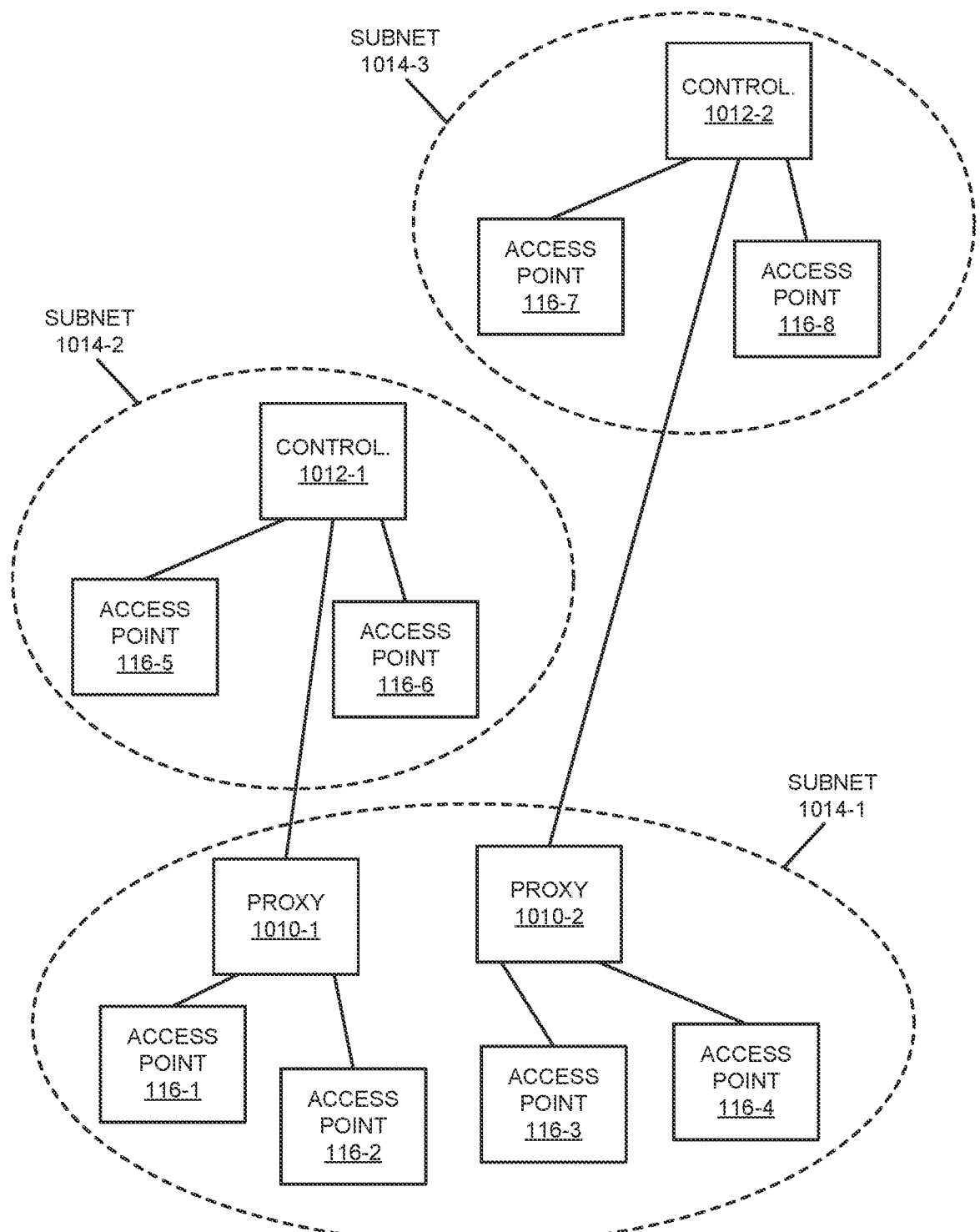
FIG. 10 is a drawing illustrating an example of a redirect technique in accordance with an embodiment of the present disclosure.

This is shown in FIG. 10, which presents a drawing illustrating an example of a redirect technique. Notably, LWAPP proxies 1010 may automatically redirect access points 116 to their associated controllers 1012. Note that a given LWAPP proxy (such as LWAPP proxy 1010-1) may be located in a same subnet (such as subnet 1014-1) as one or more access points 116 (such as access point 116-1) with which it communicates. Furthermore, an associated controller (such as controller 1012-1) may be located in a different subnet (such as subnet 1014-2).

In embodiments of a hybrid proxy mode, a proxy may redirect an access point to its bound controller according to the configuration from the controller. Notably, the proxy may discover the controller and may receive a discovery response. Then, the proxy may provide a join request to the controller and may receive a join response from the controller. Next, the proxy may provide a configuration request to the controller and may receive a configuration response from the controller.

Subsequently, an access point may discover the proxy and may receive a discovery response from the proxy with location information for the controller (such as an IP address of the controller). Then, the access point may provide a join request to the controller and may receive a join response from the controller. Next, the access point may provide a configuration request to the controller and may receive a configuration response from the controller. Moreover, the access point and the controller may perform wireless local area network (WLAN) deployment and/or may exchange one or more heartbeat messages that confirm that the access point is still operating normally and that the access point and the controller are able to communicate with each other.

Moreover, in embodiments of a full proxy mode, a proxy may perform at least some functions of a controller, which were offloaded by the controller to the proxy. Notably, the proxy may discover the controller and may receive a discovery response. Then, the proxy may provide a join request to the controller and may receive a join response from the controller. Next, the proxy may provide a configuration request to the controller and may receive a configuration response from the controller.

Subsequently, an access point may discover the proxy and may receive a discovery response from the proxy with location information for the controller. Then, the access point may provide a join request to the computer and may receive a join response from the computer. Next, the access point may provide a configuration request to the computer and may receive a configuration response from the computer. Moreover, the access point and the computer may perform WLAN deployment and/or may exchange one or more heartbeat messages that confirm that the access point is still operating normally and that the access point and the computer are able to communicate with each other. In response, the computer may provide the heartbeat message to the controller and may receive a heartbeat message from the controller. Furthermore, the access point may provide an access-point event report to the computer, which provide the access-point event report to the controller. Additionally, the access point and the computer may exchange station connection information. Then, the computer may provide a station statistics report to the controller. Alternatively or additionally, the access point may provide a station event to the computer, which provides the station event to the controller; and/or the controller may provide a station command to the computer, which provides the station command to the access point.

Note that in the full proxy mode, the proxy may: maintain an LWAPP connection between the access point and the proxy; perform configuration deployment to its assigned access points; periodically synchronize the status of access points to the controller via its heartbeat; forward events from the access point to the controller; perform wireless station or client connection management (such as IEEE 802.11 authorization, association, and/or authentication); periodically provide statistics reports for wireless stations; periodically provide event reports for stations; and/or delegate a station command from the controller. In some embodiments, however, the controller may continue to perform authentication operations directly with the access point (instead of performing these operations via the proxy).

We now describe embodiments of an electronic device, which may perform at least some of the operations in the communication techniques. FIG. 11 presents a block diagram illustrating an example of an electronic device 1100 in accordance with some embodiments, such as one of: base station 108, one of electronic devices 110, computer 112, one of access points 116, one of radio nodes 118, switch 128 or controller 130. This electronic device includes processing subsystem 1110, memory subsystem 1112, and networking subsystem 1114. Processing subsystem 1110 includes one or more devices configured to perform computational operations. For example, processing subsystem 1110 can include one or more microprocessors, graphics processing units (GPUs), ASICs, microcontrollers, programmable-logic devices, and/or one or more digital signal processors (DSPs).

Memory subsystem 1112 includes one or more devices for storing data and/or instructions for processing subsystem 1110 and networking subsystem 1114. For example, memory subsystem 1112 can include DRAM, static random access memory (SRAM), and/or other types of memory. In some embodiments, instructions for processing subsystem 1110 in memory subsystem 1112 include: one or more program modules or sets of instructions (such as program instructions 1122 or operating system 1124, such as Linux, UNIX, Windows Server, or another customized and proprietary operating system), which may be executed by processing subsystem 1110. Note that the one or more computer programs, program modules or instructions may constitute a computer-program mechanism. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Networking subsystem 1114 includes one or more devices configured to couple to and communicate on a wired and/or wireless network (i.e., to perform network operations), including: control logic 1116, an interface circuit 1118 and one or more antennas 1120 (or antenna elements). (While FIG. 11 includes one or more antennas 1120, in some embodiments electronic device 1100 includes one or more nodes, such as antenna nodes 1108, e.g., a metal pad or a connector, which can be coupled to the one or more antennas 1120, or nodes 1106, which can be coupled to a wired or optical connection or link. Thus, electronic device 1100 may or may not include the one or more antennas 1120. Note that the one or more nodes 1106 and/or antenna nodes 1108 may constitute input(s) to and/or output(s) from electronic device 1100.) For example, networking subsystem 1114 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 1100 may be adapted or changed using pattern shapers (such as directors or reflectors) and/or one or more antennas 1120 (or antenna elements), which can be independently and selectively electrically coupled to ground to steer the transmit antenna pattern in different directions. Thus, if one or more antennas 1120 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1100 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting advertising or beacon frames and/or scanning for advertising frames transmitted by other electronic devices as described previously.

Within electronic device 1100, processing subsystem 1110, memory subsystem 1112, and networking subsystem 1114 are coupled together using bus 1128. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display, which may include a display driver and the display, such as a liquid-crystal display, a multi-touch touchscreen, etc.

Moreover, electronic device 1100 may include a user-interface subsystem 1130, such as: a mouse, a keyboard, a trackpad, a stylus, a voice-recognition interface, and/or another human-machine interface. In some embodiments, user-interface subsystem 1130 may include or may interact with a touch-sensitive display in display subsystem 1126.

Electronic device 1100 can be (or can be included in) any electronic device with at least one network interface. For example, electronic device 1100 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Additionally, one or more of the subsystems may not be present in electronic device 1100. Moreover, in some embodiments, electronic device 1100 may include one or more additional subsystems that are not shown in FIG. 11. Also, although separate subsystems are shown in FIG. 11, in some embodiments some or all of a given subsystem or component can be integrated into one or more of the other subsystems or component(s) in electronic device 1100. For example, in some embodiments instructions 1122 is included in operating system 1124 and/or control logic 1116 is included in interface circuit 1118.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1114 and/or of electronic device 1100. The integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios. Note that the radios in multiple-radio embodiments function in a similar way to the described single-radio embodiments.

In some embodiments, networking subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1122, operating system 1124 (such as a driver for interface circuit 1118) or in firmware in interface circuit 1118. Alternatively or additionally, at least some of the operations in the communication techniques may be implemented in a physical layer, such as hardware in interface circuit 1118.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
an interface circuit configured to communicate with a computer and a controller of the access point using a wired communication protocol, wherein the computer comprises a lightweight access point protocol (LWAPP) proxy for at least some management functions of the controller, and wherein the access point is configured to:
provide, addressed to the computer, a location request;
based at least in part on the location request, receive, associated with the computer, a location response comprising location information specifying an address of the controller, wherein the controller is located in a different subnet in a network than the access point;
provide, addressed to the controller, a configuration request; and
receive, associated with the controller, a configuration response comprising second information specifying a configuration of the access point.

2. The access point of claim 1, wherein the access point is configured to provide, addressed to the controller, a heartbeat message.

3. The access point of claim 1, wherein the computer is located in a same subnet in the network as the access point.

4. A computer, comprising:
an interface circuit configured to communicate with an access point and a controller of the access point using a wired communication protocol, wherein the computer comprises a lightweight access point protocol (LWAPP) proxy for at least some management functions of the controller, and wherein the computer is configured to:
  receive, associated with the controller, configuration information that specifies the access point;
  receive, associated with the access point, a location request; and
  based at least in part on the location request, provide, addressed to the access point, a location response comprising location information specifying an address of the controller, wherein the controller is located in a different subnet in a network than the access point.

5. The computer of claim 4, wherein the computer is configured to maintain a LWAPP connection with the controller.

6. The computer of claim 4, wherein the computer communicates with the controller via a LWAPP connection.

7. The computer of claim 4, wherein the computer comprises the LWAPP proxy for a subset of access points in a subnet of the access point; and
  wherein the subset of the access points comprises the access point.

8. The computer of claim 4, wherein the computer is located in a same subnet in the network as the access point.

9. The computer of claim 4, wherein the configuration information comprises the location information.

10. A controller, comprising:
  an interface circuit configured to communicate with an access point and a computer using a wired communication protocol, wherein the computer comprises a lightweight access point protocol (LWAPP) proxy for at least some management functions of the controller, and wherein the controller is configured to:
    provide, addressed to the computer, configuration information that specifies the access point;
    receive, associated with the access point, a configuration request, wherein the controller is located in a different subnet in a network than the access point; and
    provide, addressed to the access point, a configuration response comprising second information specifying a configuration of the access point.

11. The controller of claim 10, wherein the controller is configured to maintain a LWAPP connection with the computer.

12. The controller of claim 10, wherein the controller communicates with the computer via a LWAPP connection.

13. The controller of claim 10, wherein the computer comprises the LWAPP proxy for a subset of access points in the subnet, which comprises the access point.

14. The controller of claim 10, wherein the computer is located in a same subnet in the network as the access point.

15. The controller of claim 10, wherein the configuration information comprises location information comprising an address of the controller.

16. The controller of claim 10, wherein the controller is configured to:
  provide, addressed to a second computer, configuration information that specifies a second access point;
  receive, associated with the second access point, a second configuration request, wherein the controller is located in a different subnet in a network than the second access point and the second subnet is located in a different subnet in the network than the access point; and
  provide, addressed to the second access point, a second configuration response comprising third information specifying a configuration of the second access point.

17. The controller of claim 10, wherein the controller is configured to receive, associated with the access point, a heartbeat message.

18. The controller of claim 10, wherein the controller comprises a server for the access point, which comprises a client.

* * * * *